United States Patent
Ahn et al.

(10) Patent No.: US 7,777,137 B2
(45) Date of Patent: Aug. 17, 2010

(54) DEVICE AND METHOD FOR TRANSMITTING SHAPE INFORMATION OF IMAGE THROUGH TACTILE SENSATION USING RHEOLOGICAL FLUID

(75) Inventors: Bum Mo Ahn, Busan (KR); Ki Uk Kyung, Gwangyang-si (KR); Jung Kim, Daejeon (KR); Dong Soo Kwon, Daejeon (KR)

(73) Assignee: Korea Advanced institute of Science and Technology, Daejeon (KR)

( * ) Notice: Subject to any disclaimer, the term of this patent is extended or adjusted under 35 U.S.C. 154(b) by 828 days.

(21) Appl. No.: 11/702,877

(22) Filed: Feb. 5, 2007

(65) Prior Publication Data
US 2007/0211032 A1    Sep. 13, 2007

(30) Foreign Application Priority Data
Mar. 13, 2006    (KR)    ...................... 10-2006-0023178

(51) Int. Cl.
*G06F 3/046* (2006.01)
(52) U.S. Cl. ...................... 178/18.07; 345/156; 434/112
(58) Field of Classification Search ................. 345/156; 178/18.07
See application file for complete search history.

(56) References Cited

U.S. PATENT DOCUMENTS

| | | | |
|---|---|---|---|
| 5,912,660 A | 6/1999 | Gouzman et al. | |
| 6,243,080 B1 * | 6/2001 | Molne | 345/173 |
| 6,339,419 B1 * | 1/2002 | Jolly et al. | 345/156 |
| 6,854,573 B2 * | 2/2005 | Jolly et al. | 188/267 |
| 6,910,699 B2 * | 6/2005 | Cherney | 280/89.13 |
| 2002/0021277 A1 * | 2/2002 | Kramer et al. | 345/156 |

FOREIGN PATENT DOCUMENTS

KR    1020030073554    4/2005

* cited by examiner

*Primary Examiner*—Richard Hjerpe
*Assistant Examiner*—Andrew Schnirel
(74) *Attorney, Agent, or Firm*—Kevin D. Jablonski; Graybeal Jackson LLP

(57) ABSTRACT

The tactile transmission device includes a plurality of cells arranged at regular intervals, each having a storage space therein. A contact member is installed in each of the cells, an upper portion of the contact member protruding out of the cell. An elastic member is installed in each of the cells, and biases the contact member upwards. A sensor is installed in each of the cells, and measures displacement of the contact member. A magneto-rheological fluid is contained in each of the cells. A coil is installed in each of the cells and generates a magnetic field in the cell. A control means compares a shape information value of the image with a displacement value of the contact member output from the sensor, thus controlling a quantity of current applied to the coil. According to the present invention, the shape information of an image displayed on a screen is corrected to be suitable for a user's characteristics, thus more precisely transmitting the shape information on the screen to the user. Further, a transmission medium for transmitting a tactile sensation to a user has a simple construction, so that miniaturization of the tactile transmission device is very easily realized.

9 Claims, 7 Drawing Sheets (a)  (b)

(a)  (b)

(a)

(b)

(c)

(d)

(e)

(f)

DEVICE AND METHOD FOR TRANSMITTING SHAPE INFORMATION OF IMAGE THROUGH TACTILE SENSATION USING RHEOLOGICAL FLUID

CROSS-REFERENCE TO RELATED APPLICATION

This is application claims foreign priority benefits under 35 USC §119 to Korean Patent Application No. 10-2006-0023178 filed 13 Mar. 2006, which is incorporated herein by reference.

BACKGROUND OF THE INVENTION

1. Field of the Invention

The present invention relates generally to a device and method for transmitting shape information of an image displayed on a screen through a user's tactile sensation and, more particularly, to a tactile transmission device and method, which realizes the miniaturization of the device, thus allowing the device to be easily provided in small electronic equipment, and which is capable of precisely transmitting shape information of an image.

2. Description of the Related Art

Recently, technology for transmitting an image displayed on a screen to a user has been developed. As an example of such technology, Korean Patent No. 536621 and U.S. Pat. No. 5,912,660 have been proposed.

The conventional inventions are provided with a tactile transmission part having a plurality of pins which are movable up and down. The pins of the tactile transmission part individually move up and down according to the image displayed on a screen, thus stimulating a user's hand or fingers. Thus, according to the prior art, by adjusting the number and the arrangement of the pins stimulating the fingers, the shape information (curvature, texture, etc.) of the image displayed on the screen is transmitted to the user.

However, the prior art must be provided with several units for moving the pins up and down, thus there is a limitation in the reduction of the size and weight of the tactile transmission device. Hence, it is substantially impossible to apply the prior art to portable equipment, such as a Personal Digital Assistant (PDA) or a mobile phone, the size of which is becoming smaller and smaller.

Meanwhile, the tactile sensation, transmitted to a user's hand and fingers through the plurality of pins, varies in different regions of the hand and fingers. The reason for this is because the hand and fingers are not planar, but have a three-dimensional shape having many curved surfaces and curvatures, and the thickness of the skin is different in different regions of the hand or fingers. However, the prior art simply moves the pins to stimulate the user's hand or fingers without considering the shape of the hand and fingers or the thickness of the skin, so that the shape information obtained through the user's tactile sensation is not equal to that obtained by viewing an image. Thus, a new tactile transmission device, which is capable of transmitting the shape information of an image in consideration of the characteristics of a user's body, is keenly required.

SUMMARY OF THE INVENTION

Accordingly, the present invention has been made keeping in mind the above problems occurring in the prior art, and an object of the present invention is to provide a tactile transmission device and method, which has a simple structure that realizes the miniaturization and lightness of the device, and corrects shape information of an image displayed on a screen in consideration of the characteristics of a body part, thus more precisely transmitting the shape information of the image to a user.

The present invention is intended to realize the miniaturization of a tactile transmission device, thus allowing the device to be easily mounted to small electronic equipment, and intended to precisely transmit shape information of an image to a user. In this case, shape information comprises information including curvature, texture, letters, or Braille dots substituting for letters, which can be expressed on the screen of small equipment, such as a mobile phone, a PDA, or a Portable Multimedia Player (PMP). Thus, all of them (curvature, texture, letters, or Braille dots) are designated as shape information.

In order to accomplish the above object, the present invention provides a tactile transmission device for transmitting shape information of an image using a rheological fluid, which is constructed to transmit shape information of various images displayed on a screen to a user so that the user feels the shape information through tactile sensation. The tactile transmission device includes a plurality of cells arranged at regular intervals and each having a storage space therein, a contact member installed in each of the cells, an upper portion of the contact member protruding out of the cell, an elastic member installed in each of the cells and biasing the contact member upwards, a sensor installed in each of the cells and measuring displacement of the contact member, a magneto-rheological fluid contained in each of the cells, a coil installed in each of the cells and generating a magnetic field in the cell, and a control means comparing a shape information value of the image with a displacement value of the contact member output from the sensor, thus controlling a quantity of current applied to the coil.

Further, the present invention provides a tactile transmission device for transmitting shape information of an image using a rheological fluid, which is constructed to transmit shape information of various images displayed on a screen to a user so that the user feels the shape information through tactile sensation. In this case, the tactile transmission device includes a plurality of cells arranged at regular intervals and each having a storage space therein, a contact member installed in each of the cells, an upper portion of the contact member protruding out of the cell, an elastic member installed in each of the cells and biasing the contact member upwards, a sensor installed in each of the cells and measuring displacement of the contact member, an electro-rheological fluid contained in each of the cells, an electrode installed in each of the cells and generating an electric field in the cell, and a control means comparing a shape information value of the image with a displacement value of the contact member output from the sensor, thus controlling a quantity of current applied to the electrode.

According to this invention, the elastic member comprises a cantilever, a first end of the cantilever secured to a sidewall of each of the cells, and a second end of the cantilever coupled to a lower end of the contact member. Further, the contact member is able to be bent in a curve form.

The present invention provides a method of transmitting shape information of various images displayed on a screen to a user using the above-mentioned tactile transmission device, including the steps of (a) receiving the shape information of various images displayed on the screen, (b) receiving displacement of a contact member when the user contacts the contact member, using a sensor, and (c) comparing a value of the shape information obtained at step (a) with a value of the displacement of the contact member obtained at step (b), and controlling a quantity of current applied to a coil or an electrode.

Further, the present invention provides a method of transmitting shape information of various images displayed on a screen to a user using a plurality of tactile transmission units which are arranged in a 2-dimensional plane, and each of which has a contact member moving up and down in a direction perpendicular to the plane, the method including the steps of (a) storing a displacement value of each of the contact members when part of the user's body contacts each of the tactile transmission units, (b) receiving the shape information of various images displayed on the screen, (c) converting the shape information obtained at step (b) into a displacement value of each of the contact members, (d) correcting the displacement value of each of the contact members obtained at step (c), based on the displacement value of each of the contact members obtained at step (a), thus determining a set position of each of the contact members, and (e) controlling a stop position of each of the contact members so that each of the contact members moves by the displacement value determined at step (d) when part of the user's body contacts each of the tactile transmission units again.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, the preferred embodiments of the present invention will be described in detail with reference to the accompanying drawings.

Figure 1:
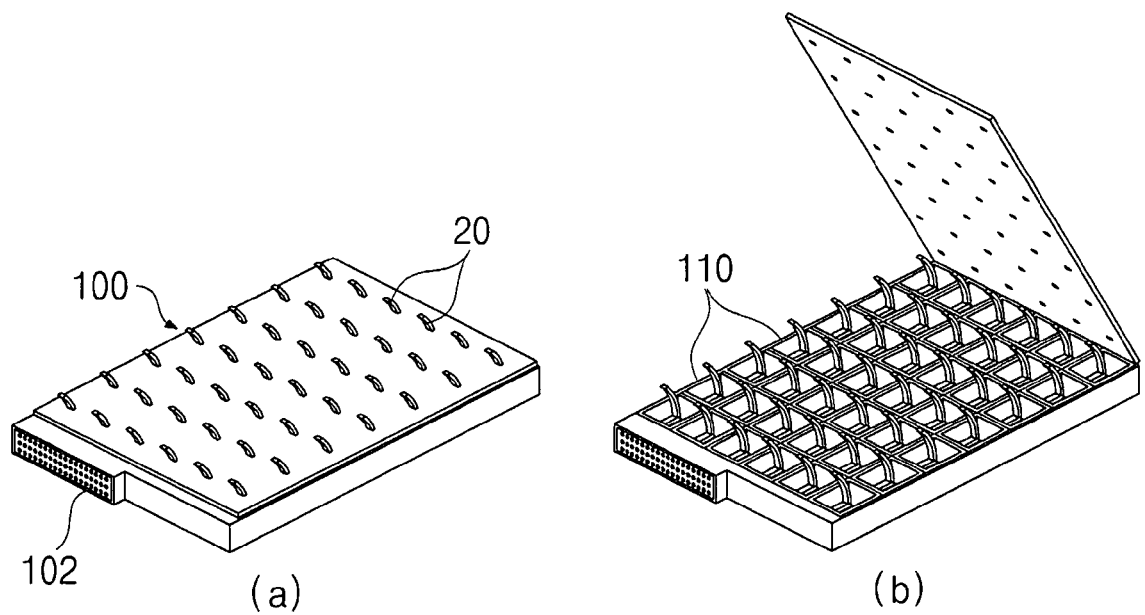
FIGS. 1a and 1b are perspective views showing a tactile transmission device, according to the present invention.

FIGS. 1a and 1b are perspective views showing a tactile transmission device, according to the present invention.

As shown in FIG. 1a, the tactile transmission device 100 has a box-shaped body, and a plurality of contact members 20 protrudes upwards from the body. Further, as shown in FIG. 1b, the tactile transmission device 100 comprises a plurality of tactile transmission units 110 equipped with the contact members 20. The tactile transmission units 110 are arranged in the widthwise direction of the tactile transmission device 100. The tactile transmission device 100 is provided with a control means (not shown) which is electrically connected to each of the tactile transmission units 110 and controls each tactile transmission unit 110. The tactile transmission device 100 has a connector 102 which is connected to small equipment, such as a mobile phone or a PDA.

Figure 2:
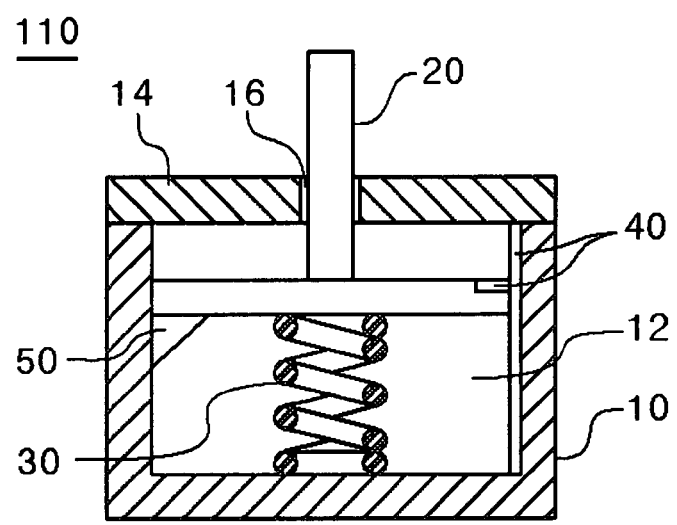
FIG. 2 is a concept view showing the important construction of a tactile transmission unit constituting the tactile transmission device of FIGS. 1a and 1b.

FIG. 2 is a concept view showing the important construction of the tactile transmission unit constituting the tactile transmission device of FIGS. 1a and 1b.

As shown in FIG. 2, the tactile transmission unit 110 includes a cell 10, the contact member 20, an elastic member 30, a sensor 40, and a locking means 50.

The cell 10 has a storage space 12 therein, with a cover 14 covering the storage space 12. A hole 16 is formed in the cover 14 to communicate with the storage space 12. The contact member 20 is installed in the cell 10. The upper portion of the contact member 20 passes through the hole 16 and protrudes out of the cell 10, while the lower portion of the contact member 20 is secured to the cell 10 via the elastic member 30. The lower portion of the contact member 20 is preferably larger than the hole 16 so that the contact member 20 cannot be completely removed from the cell 10 through the hole 16. The elastic member 30 always biases the contact member 20, which moves into the cell 10, outwards, thus always keeping the protruding length of the contact member 20 constant. A spring which is compressible and extensible is preferably used as the elastic member 30.

The sensor 40 is installed at the cell 10, and measures the vertical moving distance of the contact member 20, prior to sending the measured value to the control means. The sensor 40 may be installed at the contact member 20. The locking means 50 is installed in the cell 10, and is electrically connected to the control means. The locking means 50 serves to limit the movement of the contact member 20 in response to the signal output from the control means.

Figure 3:
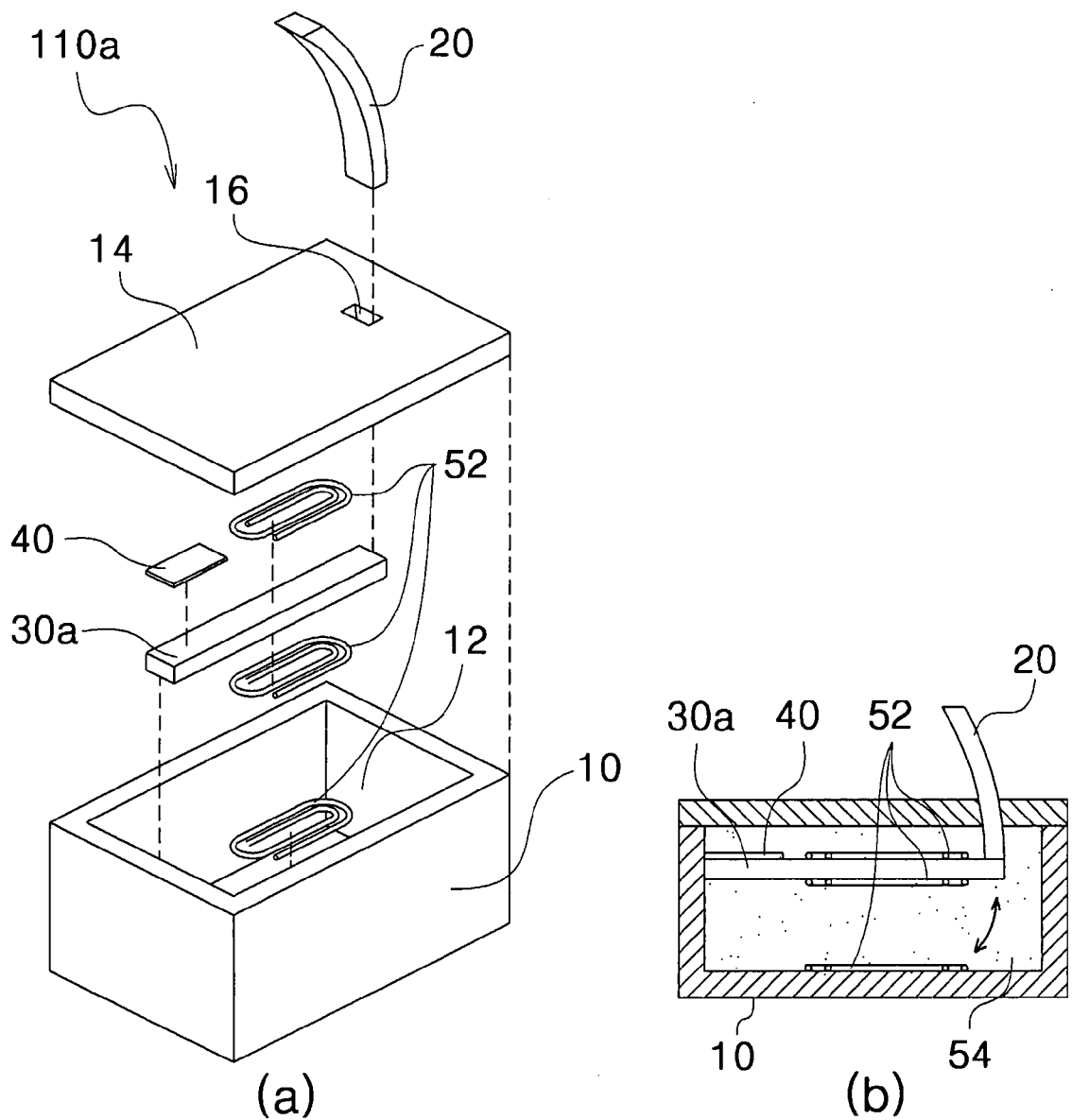
FIGS. 3a and 3b are an exploded perspective view and a sectional view showing a tactile transmission unit, according to the first embodiment of the invention.

A tactile transmission unit, which will be described below, changes the shape of the elastic member 30 and the locking means 50, thus realizing the miniaturization of the tactile transmission device. FIGS. 3a and 3b are an exploded perspective view and a sectional view showing a tactile transmission unit, according to the first embodiment of the invention.

As shown in FIGS. 3a and 3b, the tactile transmission unit 110a according to the first embodiment includes a cell 10, a contact member 20, an elastic member 30a, a sensor 40, coils 52, and a magneto-rheological fluid 54.

Referring to FIG. 3a, the cell 10 has a storage space 12 and a cover 14. The storage space 12 defines a semi-hermetic space which stores liquid in the cell 10. The cover 14 is mounted to the open side of the storage space 12, thus preventing liquid from leaking out of the storage space 12. A hole 16 is formed in the cover 14, so that the contact member 20 is inserted into the hole 16.

The elastic member 30a is a member having predetermined strength and elasticity, and has the shape of a cantilever which is secured at one end thereof to the sidewall of the storage space 12, and is freely movable at the other end thereof. The elastic member 30a is mounted to the cell 10. Thus, the other end of the elastic member 30a is freely movable up and down by external force. When the external force is eliminated, the elastic member 30a reciprocates in a vertical direction and is returned to its original position by the elasticity thereof.

The contact member 20 is coupled to the other end of the elastic member 30a having elastic force, and moves in and out of the hole 16 according to whether external force is applied or not, or whether such force is large or not. When there is no external force, most of the body of the contact member 20 protrudes out of the cell 10 through the hole 16. Meanwhile, the vertical movement of the contact member 20 is conducted along a curve relative to the location of coupling between the elastic member 30a and the storage space 12. Thus, as shown in the sectional view of FIG. 3b, it is preferable that the contact member 20 and the hole 16 have a curved shape so as to reduce the gap between the contact member 20 and the hole 16. Thereby, the leakage of the magneto-rheological fluid 54 contained in the storage space 12 can be efficiently prevented.

The sensor 40 is installed at the cell 10, the contact member 20 or the elastic member 30a, and measures the displacement of the contact member 20. According to this embodiment, the sensor 40 is installed at the elastic member 30a. The sensor 40 measures the vertical displacement of the contact member 20 based on the bending degree of the elastic member 30a.

In this embodiment, the coils 52 are mounted to the wall of the storage space 12 and/or the upper and lower surfaces of the elastic member 30a. The coils 52 are electrically connected to the control means to be controlled by the control means. The coils 52 are operated in response to the control signal of the control means, thus changing the magnetic field in the storage space 12.

As shown in FIG. 3b, the magneto-rheological fluid 54 is contained in the storage space 12. The viscosity of the magneto-rheological fluid 54 changes in response to variation of the magnetic field in the storage space 12. According to this embodiment, the viscosity of the magneto-rheological fluid 54 is low when there is no magnetic field. Meanwhile, when a magnetic field is generated, the magneto-rheological fluid 54 changes to a fluid having high viscosity which is almost solid.

The tactile transmission unit 110a constructed as described above has a simple mechanical and electrical construction, so that miniaturization and lightness of the tactile transmission device can be achieved.

The operation of the tactile transmission unit 110a according to this embodiment will be described below in detail.

Figure 4:
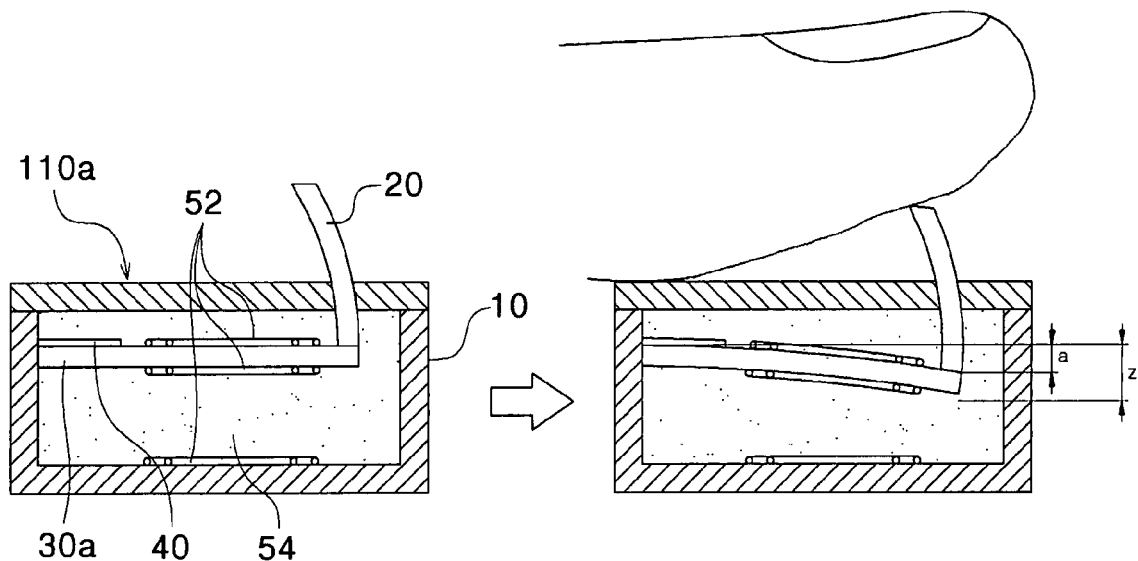
FIG. 4 is a sectional view illustrating the operational principle of the tactile transmission unit of FIGS. 3a and 3b.

FIG. 4 is a sectional view illustrating the operational principle of the tactile transmission unit of FIGS. 3a and 3b, FIGS. 5a and 5b are views showing the use of the tactile transmission device, according to the present invention, and FIGS. 6a to 6f are schematic views showing various examples expressed by the tactile transmission device, according to the present invention.

As shown in FIG. 4, when no external force is applied, most of the contact member 20 protrudes out of the cell 10, and the viscosity of the magneto-rheological fluid 54 remains low.

In such a state, an image is displayed on the screen of small equipment to which the tactile transmission device is mounted or coupled, for example, a mobile phone, a PDA, a PMP, etc. When a signal instructing the transmission of the image to a user is generated (namely, when the user inputs an instruction signal to transmit the image to the tactile transmission device or an image signal is converted into an electric signal and the electric signal is input to the tactile transmission device by the function of an image program), the control means converts the shape information of the image, which is being output to the screen, into a prescribed value.

Figure 5:
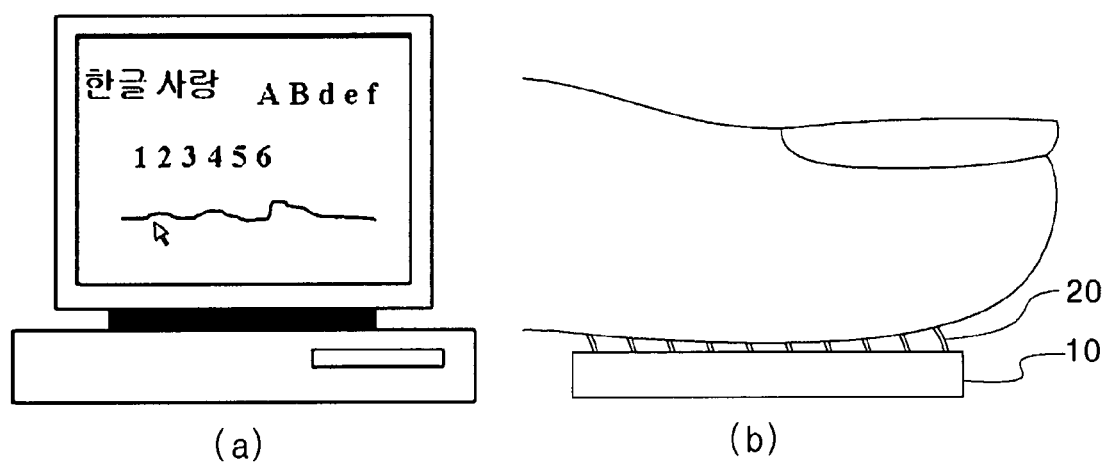
FIGS. 5a and 5b are views showing the use of the tactile transmission device, according to the present invention.
Figure 6:
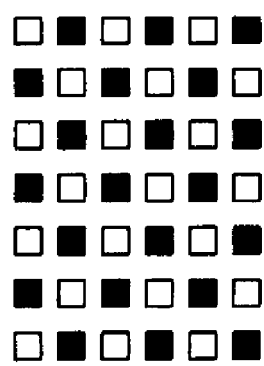
FIGS. 6a to 6f are schematic views showing various examples expressed by the tactile transmission device, according to the present invention.
Figure 6:
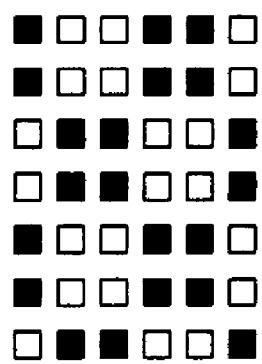
Figure 6:
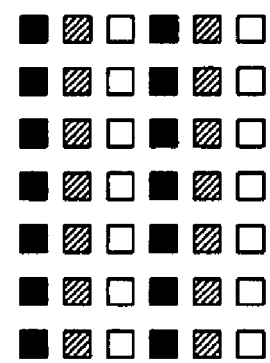
Figure 6:
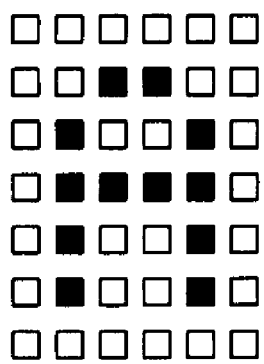
Figure 6:
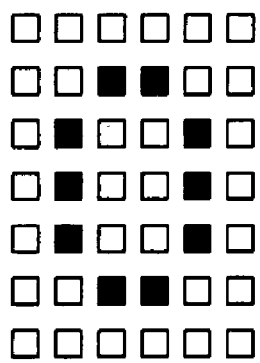
Figure 6:
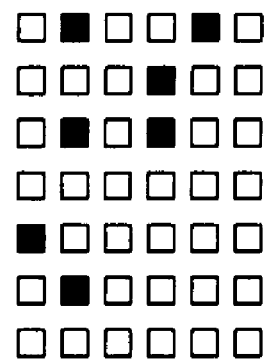

For example, the shape information is converted into a 3-dimensional matrix value. Here, the widthwise direction and the lengthwise direction of the screen are designated as an x-axis and a y-axis, and the morphological characteristic of the shape information of FIG. 5a is designated as values of a z-axis. Further, the control means makes converted 3-dimensional matrix values correspond to the plurality of tactile transmission units which are arranged in the widthwise direction and the lengthwise direction of the tactile transmission device, thus calculating the displacement (z-axis value of the 3-dimensional matrix) of the contact members 20. The control means informs a user that it is ready to express the shape information of the associated image through the screen or another output device.

At this time, as shown in FIG. 5b, the user puts his or her hand or fingers on the tactile transmission device. Then, the contact members 20 are moved downwards into the cell 10 by the pressure of the hand or fingers, and the sensor 40 frequently sends the position of each contact member 20 to the control means.

When each contact member 20 moves downwards and reaches a position suitable for expressing the shape information of the image, the control means applies electric current to the coils 52, and thus the magnetic field is generated in the cell 10. Thus, the viscosity of the magneto-rheological fluid 54 filled in the cell 10 is gradually increased, thus hindering the movement of each contact member 20. Each contact member 20 is stopped at a position set by the control means, before reaching the maximum downward displacement z.

The stop position 'a' of each contact member 20 is changed according to the shape information of the image displayed on the screen, and the position on an x-y plane (widthwise and lengthwise direction of the tactile transmission device, namely, the direction of a plane) of the cell 10, in which the contact member 20 is disposed. Thus, the user feels the shape information of the image which is displayed on the screen by the height difference between the plurality of contact members 20 arranged in the planar direction of the tactile transmission device.

As such, according to this invention, the displacement of each contact member 20 is detected by the sensor 40, and is corrected to be suitable for the body characteristics of a user. Thus, the shape information of the image displayed on the screen can be more precisely transmitted to the user.

FIGS. 6a to 6f are schematic views showing various examples expressed by the tactile transmission device, according to the present invention. The shape information expressed on the screen is precisely transmitted by the change of height of the plurality of contact members 20. In FIGS. 6a to 6f, the black color represents the transmission of pressure to the user's hand or fingers through the contact members 20, oblique lines represent the transmission of pressure less than that of black colored portions to the user's hand or fingers, and the white color means that no pressure is transmitted to the user's hand or fingers through the contact members 20.

Meanwhile, FIG. 4 slightly exaggerates the size of the tactile transmission unit 110a in order to illustrate the operational principle of the tactile transmission unit 110a. Actually, one finger is put on a plurality of tactile transmission units 110a.

Figure 7:
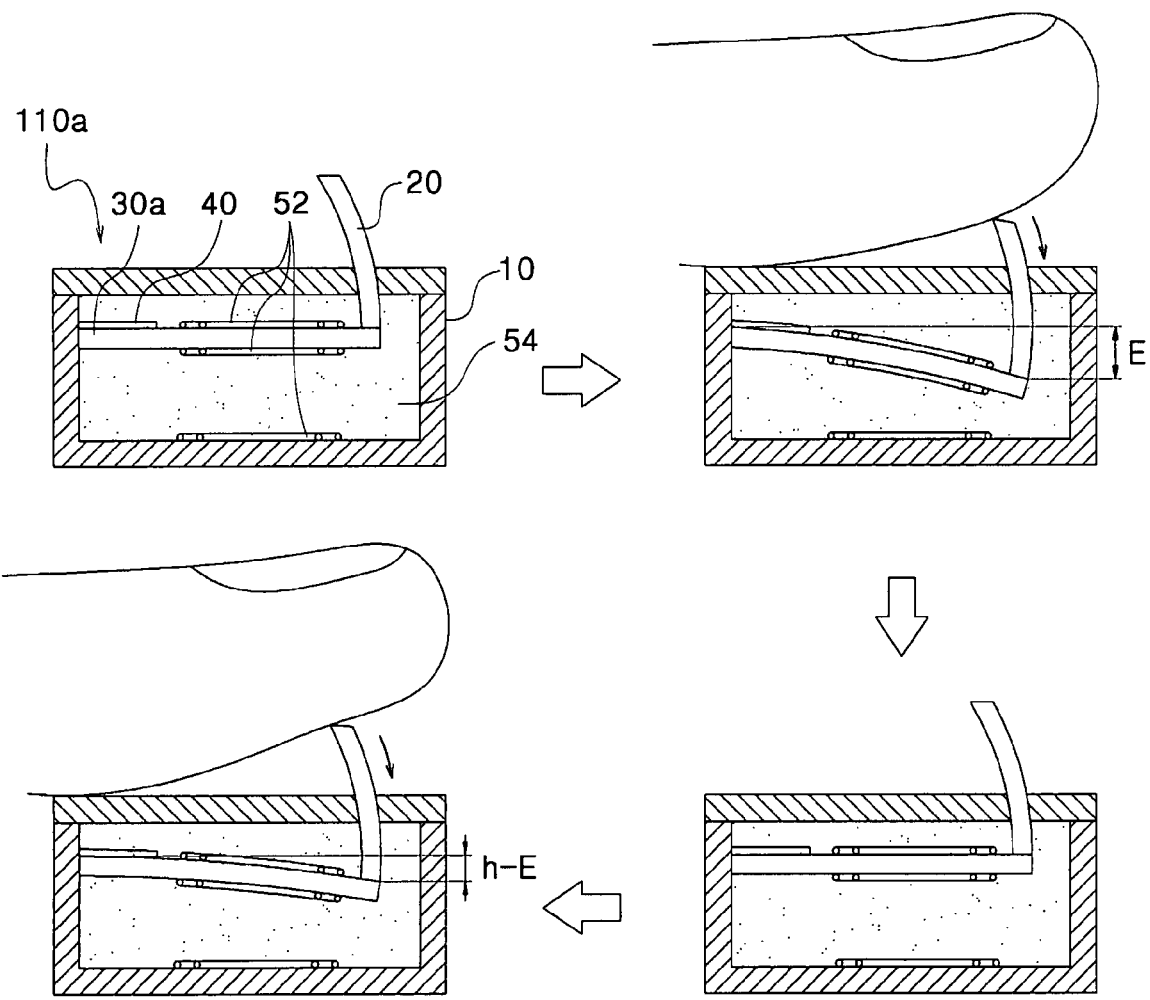
FIG. 7 is a sectional view illustrating another operating method of the tactile transmission unit of FIGS. 3a and 3b.

FIG. 7 is a sectional view illustrating another operating method of the tactile transmission unit of FIGS. 3a and 3b. As shown in FIG. 7, when no force is applied, most of the body of each contact member 20 protrudes out of the cell 10, and the magneto-rheological fluid 54 remains in a low-viscosity state.

When the user puts his or her hand or fingers on the tactile transmission device 100 to conduct initial setting, each contact member 20 protruding upwards from the cell 10 of the tactile transmission unit 110a is pressed. The sensor 40 detects the displacement of each contact member 20 through the bending deformation of the elastic member 30a due to the downward movement of the contact member 20, and measures the initial displacement E of each contact member 20 which is moved downwards finally, prior to sending the initial displacement to the control means. At this time, the displacement of each contact member 20 is changed according to the characteristics of regions of the hand or fingers or the characteristics of the user's body.

After the initial setting has been completed, the user removes his or her hand or fingers from the tactile transmission device 100. At this time, each contact member 20 is returned to its original position by the elasticity of the elastic member 30a.

In such a state, when the shape information of the image to be transmitted through the tactile transmission device 100 is displayed on the screen, the control means converts the shape information of an associated image into the 3-dimensional matrix. Thereby, the displacement, that is, a set value h of the contact member 20 installed in each cell 10, is calculated. Further, the control means determines the final displacement of each contact member 20, that is, the final set value h-E, in consideration of the set value h and the initial displacement E.

When the user puts his or her hand or fingers on the tactile transmission device 100 to press each contact member 20, the control means monitors the displacement of each contact member 20 through the sensor 40. When the displacement reaches the final set value h-E during the monitoring operation, electric current is applied to the coils 52. At this time, the coils 52 generate a magnetic field using the applied current, and the magneto-rheological fluid 54 is changed into a high viscosity-state which is almost a solid, by the magnetic field, thus locking the movement of each elastic member 30a and each contact member 20.

As such, according to this embodiment, the displacement of each contact member 20 is detected by the sensor 40 and is corrected to be suitable for the characteristics of the user's body. Thus, the shape information of the image displayed on the screen can be more precisely transmitted.

Figure 8:
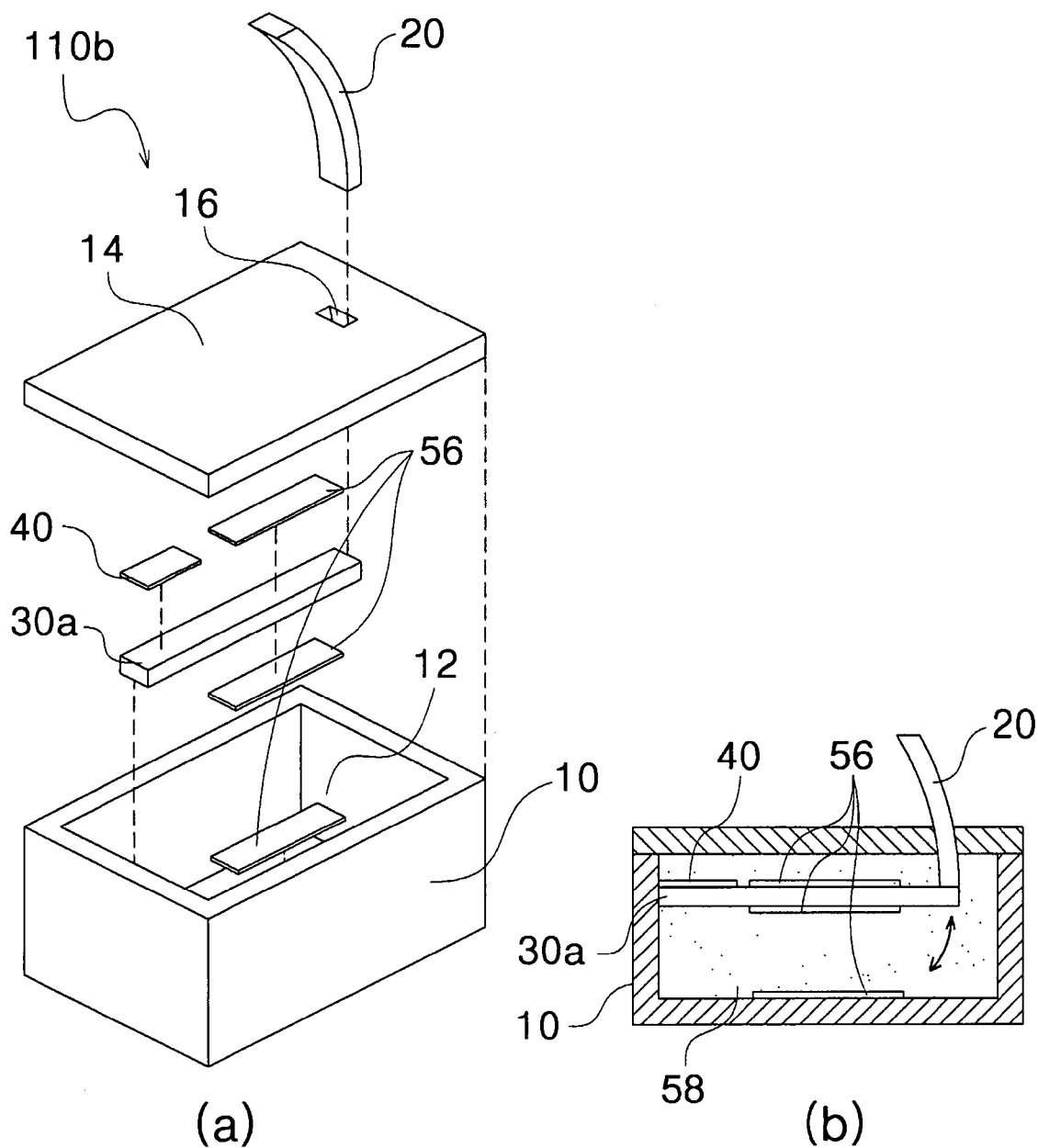
FIGS. 8a and 8b are an exploded perspective view and a sectional view showing a tactile transmission unit, according to the second embodiment of the invention.

FIGS. 8a and 8b are an exploded perspective view and a sectional view showing a tactile transmission unit, according to the second embodiment of the invention. The tactile transmission unit 110b of this embodiment is similar to that of the first embodiment shown in FIGS. 3a and 3b. The tactile transmission unit 110b of this embodiment uses electrodes 56 and an electro-rheological fluid 58 as a locking means. The electrodes 56 are installed in a storage space 12. An electric current is applied to the electrodes 56 in response to a control signal from a control means, and thus the electrodes 56 generate an electric field. The electro-rheological fluid 58 is contained in the storage space 12. The viscosity of the electro-rheological fluid 58 changes according to whether the electric field is present or not or whether the electric field is large or not. In a detailed description, when there is no electric field in the storage space 12, the electro-rheological fluid 58 remains in a low-viscosity state. Conversely, when the electric field is generated, the electro-rheological fluid 58 is changed into a high-viscosity fluid which is almost a solid.

Since the operation of the tactile transmission unit 110b according to this embodiment is equal to that of the first embodiment, the operation will not be described herein.

Figure 9:
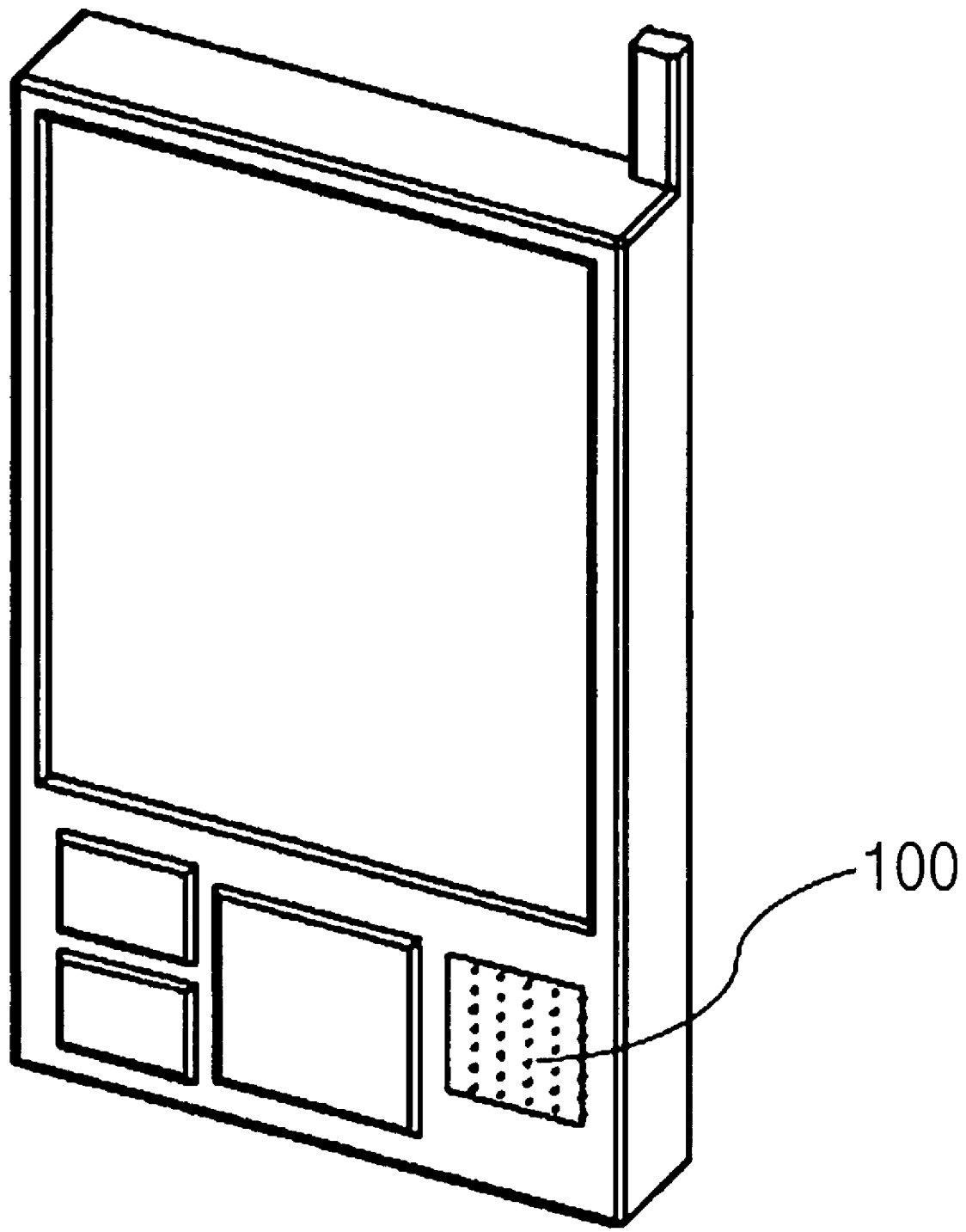
FIG. 9 is a schematic view showing an example where the tactile transmission device of the present invention is applied to portable equipment.

FIG. 9 is a schematic view showing an example of the tactile transmission device of the present invention applied to portable equipment. As shown in FIG. 9, since the tactile transmission device of the invention may be constructed to have a rather small volume, the tactile transmission device can be mounted to small electronic equipment, such as a PDA, a mobile phone, or a mouse.

According to the present invention, the shape information (curvature, texture, letters, signs or Braille dots) of an image displayed on a screen is corrected to be suitable for a user's characteristics, thus more precisely transmitting the shape information on the screen to the user.

Further, according to the present invention, a transmission medium for transmitting a tactile sensation to a user has a simple construction, so that miniaturization of the tactile transmission device is very easily realized. Thus, the present invention can be mounted to small electronic equipment, such as a mouse, a PDA, etc.

Although the preferred embodiments of the present invention have been described with reference to the accompanying drawings, it is to be understood that the description is illustrative and not restrictive. Further, those skilled in the art will appreciate that various modifications, additions and substitutions are possible, without departing from the scope and spirit of the invention as disclosed in the accompanying claims.

What is claimed is:

1. A tactile transmission device for transmitting shape information of an image using a rheological fluid, which is constructed to transmit shape information of various images displayed on a screen to a user so that the user feels the shape information through tactile sensation, the tactile transmission device comprising:
   a plurality of cells arranged at regular intervals, and each having a storage space therein;
   a contact member installed in each of the cells, an upper portion of the contact member protruding out of the cell;
   an elastic member installed in each of the cells, and biasing the contact member upwards;
   a sensor installed in each of the cells, and measuring displacement of the contact member;
   a magneto-rheological fluid contained in each of the cells;
   a coil installed in each of the cells and adapted to generate a magnetic field in the cell; and
   a control means comparing a shape information value of the image with a displacement value of the contact member output from the sensor, thus controlling a quantity of current applied to the coil.

2. The tactile transmission device as set forth in claim 1, wherein the elastic member comprises a cantilever, a first end of the cantilever secured to a sidewall of each of the cells, and a second end of the cantilever coupled to a lower end of the contact member.

3. The tactile transmission device as set forth in claim 2, wherein the contact member is bent in a curve form.

4. A method of transmitting shape information of various images displayed on a screen to a user using a tactile transmission device of claim 1, comprising the steps of:
   (a) receiving the shape information of various images displayed on the screen;
   (b) receiving displacement of a contact member when the user contacts the contact member, using a sensor; and
   (c) comparing a value of the shape information obtained at step (a) with a value of the displacement of the contact member obtained at step (b), and controlling a quantity of current applied to a coil or an electrode.

5. A tactile transmission device for transmitting shape information of an image using a rheological fluid, which is constructed to transmit shape information of various images displayed on a screen to a user so that the user feels the shape information through tactile sensation, the tactile transmission device comprising:
   a plurality of cells arranged at regular intervals, and each having a storage space therein;
   a contact member installed in each of the cells, an upper portion of the contact member protruding out of the cell;
   an elastic member installed in each of the cells, and biasing the contact member upwards;

a sensor installed in each of the cells, and measuring displacement of the contact member;

an electro-rheological fluid contained in each of the cells;

an electrode installed in each of the cells and adapted to generate an electric field in the cell; and a control means comparing a shape information value of the image with a displacement value of the contact member output from the sensor, thus controlling a quantity of current applied to the electrode.

6. The tactile transmission device as set forth in claim 5, wherein the elastic member comprises a cantilever, a first end of the cantilever secured to a sidewall of each of the cells, and a second end of the cantilever coupled to a lower end of the contact member.

7. The tactile transmission device as set forth in claim 6, wherein the contact member is bent in a curve form.

8. A method of transmitting shape information of various images displayed on a screen to a user using a tactile transmission device of claim 5, comprising the steps of:

(a) receiving the shape information of various images displayed on the screen;

(b) receiving displacement of a contact member when the user contacts the contact member, using a sensor; and (c) comparing a value of the shape information obtained at step (a) with a value of the displacement of the contact member obtained at step (b), and controlling a quantity of current applied to a coil or an electrode.

9. A method of transmitting shape information of various images displayed on a screen to a user using a plurality of tactile transmission units which are arranged in a 2-dimensional plane, and each of which has a contact member moving up and down in a direction perpendicular to the plane, the method comprising the steps of:

(a) storing a displacement value of each of the contact members when part of the users body contacts each of the tactile transmission units;

(b) receiving the shape information of various images displayed on the screen;

(c) converting the shape information obtained at step (b) into a displacement value of each of the contact members;

(d) correcting the displacement value of each of the contact members obtained at step (c), based on the displacement value of each of the contact members obtained at step (a), thus determining a set position of each of the contact members; and (e) controlling a stop position of each of the contact members so that each of the contact members moves by the displacement value determined at step (d) when part of the user's body contacts each of the tactile transmission units again.

* * * * *